Nov. 26, 1957   J. E. JACOBS ET AL   2,814,725
TIME DISCRIMINATOR
Filed May 21, 1953
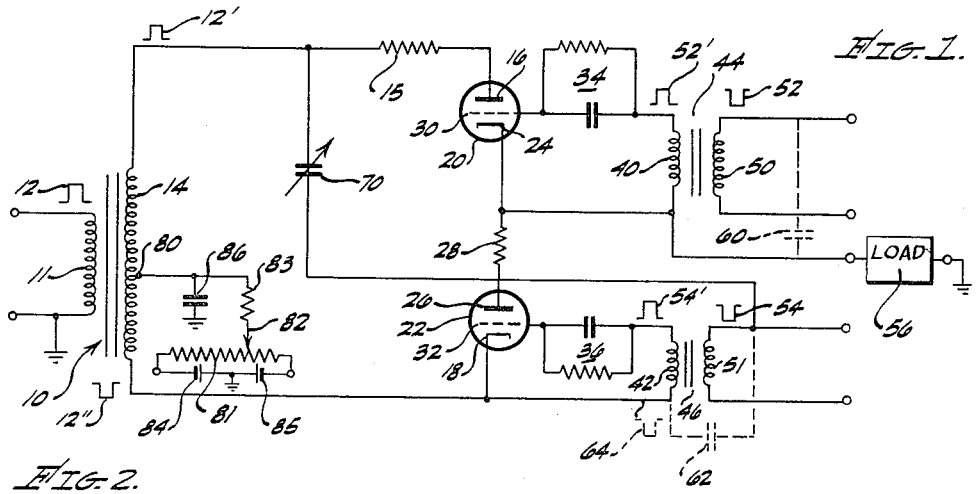
Fig. 1.
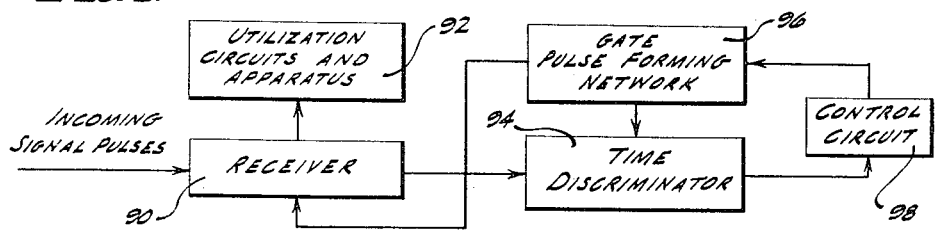
Fig. 2.
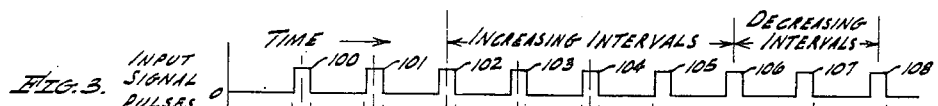
Fig. 3. INPUT SIGNAL PULSES
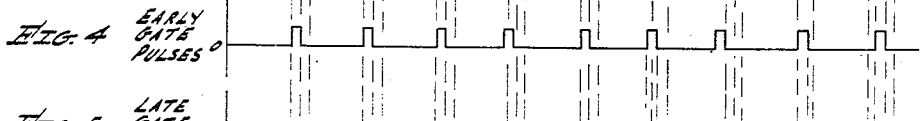
Fig. 4. EARLY GATE PULSES
Fig. 5. LATE GATE PULSES
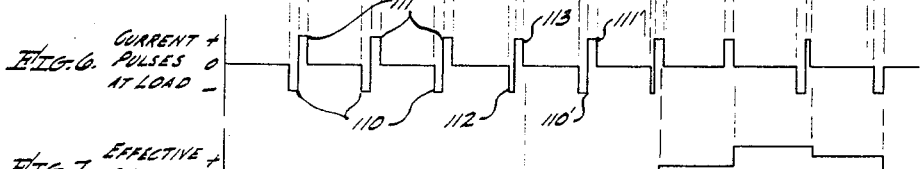
Fig. 6. CURRENT PULSES AT LOAD
Fig. 7. EFFECTIVE CHARGE CURRENT CHANGES TRANSFERRED TO LOAD
INVENTORS.
JEROME E. JACOBS,
BY ERCELL E. ST. JOHN,
Nicholas T Vahr
Their ATTORNEY.

United States Patent Office 2,814,725
Patented Nov. 26, 1957

2,814,725

TIME DISCRIMINATOR

Jerome E. Jacobs, Culver City, and Ercell E. St. John, Hawthorne, Calif., assignors, by mesne assignments, to Hughes Aircraft Company, a corporation of Delaware Application May 21, 1953, Serial No. 356,402

9 Claims. (Cl. 250—27)

This invention relates to signal-comparing networks, and more particularly to time discrimination networks for determining the difference in times of occurrence of two or more signals.

More specifically, this invention relates to a time discriminator circuit of the type that is rendered operable only during coincidence between gating pulses and signal pulses applied to the circuit. The circuit produces an output signal, the duration of which is a function of the degree of coincidence between the gating pulses and the signal pulses. This type of time discriminator has wide applications, as pointed out in "Waveforms," M. I. T. Radiation Laboratory Series, volume 19, chaper 14, "Amplitude and Time Demodulation," pages 501–544 (McGraw-Hill Book Co., Inc., New York, 1949). For example, it is customary to employ time discriminators in ultra-high-frequency pulse receivers to facilitate automatic tracking of moving objects.

In many times discriminators of the prior art, circuit operation is unduly sensitive to fluctuations in external plate supply voltages employed in the circuit. Also, time discriminators of the prior art use symmetrical tube circuits which function properly only when the tubes have substantially equal characteristics. Any tube aging creates an unbalance with concomitant loss of accuracy of the circuits.

In the disclosed time discriminator, no external plate supply source is employed, but instead, plate supply voltages for the tubes are provided by means of signal pulses impressed upon the tubes, thus eliminating one of the chief inherent difficulties of the prior art. Furthermore, circuit balancing elements are provided in the tube circuits for maintaining circuit balance even when there is a change in the tube characteristics, thus eliminating the second inherent limitation of the prior art circuits. Respective gating signals are employed to effect sequential operation of the tubes during coincidence between the signal pulses and the gating signals, whereupon output signals are developed which are a measure of the difference in the conductive periods of the tubes. To accomplish the latter, a pair of resistive elements are connected in the tube circuits, and the voltage drops across these elements are substantially equal to the voltage drops which exist across the space-current paths of the tubes during the conductive cycles, thereby reducing the effects of differences in the conductive resistances of the tubes.

Accordingly, it is an object of this invention to provide an improved pulse coincidence measuring network or gated time discriminator that is insensitive to the effects of electrical characteristics that may tend to cause false operation thereof.

It is another object of this invention to provide a time discriminator employing grid-controlled electron tubes whose plate supply voltages are created by signal pulses applied to the circuit, and in which gating pulses are applied to the control grids of the tubes for establishing error signals representative of the degree of coincidence between the signal and gating pulses.

The invention, both as to its organization and method of operation, together with further objects and advantages thereof, will be better understood from the following description considered in connection with the accompanying drawing, in which a preferred embodiment of the invention is illustrated by way of example. Referring to the drawing:

Fig. 1 is a circuit diagram of a preferred embodiment of a time discriminator circuit, in accordance with this invention;

Fig. 2 is a block diagram of an exemplary signal pulse receiving system employing the time discriminator of Fig. 1; and Figs. 3–7 are signal waveforms which illustrate the operation of the time discriminator of Fig. 1 as employed in the system of Fig. 2.

The operation of the time discriminator circuit will be described, as one example of its utility, in connection with an object-tracking radar receiver, in which "early" and "late" gating pulses developed in the receiver are to be utilized for operating the receiver in synchronism with echo signal pulses which leave a moving object at a substantially constant repetition rate. As is well known, relative motion between the object and the receiver causes the echo pulses arriving at the receiver to shift in position, or time of occurrence, with respect to the locally generated gating pulses. Therefore, a time discriminator may be employed to measure the difference in periods of coincidence between the echo pulses and each of the gating pulses to develop error signals for use in changing the positions, or times of occurrence, of the gating pulses sufficiently so that the proper time relation between the echo and gating pulses is maintained. While the invention will be described in connection with the above example, it will be obvious that the circuit has wide application as a general purpose time discriminator.

Referring to Fig. 1, a transformer 10 has its primary winding 11 connected to the output of a signal source (not shown) for receiving input signals 12, which may represent the echo pulses in the above example. The outer terminals of the secondary winding 14 are connected, respectively, through a resistor 15 to the plate 16, and directly to the cathode 18 of two grid-controlled triodes 20, 22. The cathode 24 of tube 20 and the plate 26 of tube 22 are connected through a resistor 28. Resistors 15 and 28 aid in reducing unbalance in the operation of the tubes, as will be explained later.

The grid-cathode circuits of the respective tubes are biased by means of conventional resistor-capacitor biasing networks 34, 36 so as to make the tubes 20 and 22 normally non-conducting. The grid-cathode circuits further include secondary windings 40 and 42 of transformers 44 and 46, the primary windings 50 and 51 of which are connected to respective sources of gate pulses 52 and 54, rendering the tubes conductive during coincidence between the signal pulses 12 and the gate pulses.

An output utilization or load circuit 56 is connected between cathode 24 and a point of reference potential, such as ground. The load 56 may represent the input circuit of an electronic integrator, in which case it is effectively a large capacitor which offers substantially negligible impedance to varying currents appearing at the cathode 24, i. e., cathode 24 is maintained at substantially fixed potential.

Capacitor 70 is provided for minimizing troublesome effects of interwinding capacitances 60 and 62 between the primary and secondary windings of the respective transformers 44 and 46. Referring to transformer 46, the negative gating pulse 54, applied to the upper end of the primary winding 51, may be transferred by interwinding capacitance 62 to the lower end of secondary winding 42. The transferred negative pulse, indicated as a dotted pulse 64, is a spurious signal applied to cathode 18 and tending to cause current to flow in tube 22. Where load 56 is equivalent to a large capacitor, the gating pulses 52, which otherwise might tend to cause current flow in tube 20, will be passed directly to ground. Because current may flow in tube 22 in response to the spurious signal pulses 64, and since this may not be balanced out by a corresponding current flow in tube 20, circuit unbalance may tend to become intolerable. The manner in which capacitor 70 minimizes the interwinding capacitance effects, to prevent circuit unbalance due to the spurious signal pulses 64, will be explained more clearly hereafter in the description of the operation of the circuit.

Completed direct-current paths for the individual tubes are provided by resistive coupling between the center-tap 80 of secondary winding 14 and ground. Such coupling comprises a potentiometer resistor 81 having its sliding contact 82 connected through a resistor 83 to the center tap 80. The terminals of resistor 81 are connected through respective batteries 84 and 85 to ground. The batteries are poled to provide potentials at the terminals of resistor 81 between which the average operating potential of output signals may be established. A bypass capacitor 86 is connected between center-tap 80 and ground.

The circuit above described functions as follows: Signal pulses 12 applied to primary winding 11 appear across secondary winding 14 as a positive pulse 12' and negative pulse 12" which are applied to plate 16 of tube 20 and cathode 18 of tube 22. Current will flow through each of the tubes during coincidence between signal pulses 12', 12" and the respective early gate pulses 54' and late gate pulses 52'. By tracing the direct-current paths for the individual tubes, it will be seen that current flow through the respective tubes will be in opposite directions with respect to the cathode 24 of tube 20. Accordingly, there is a resulting net change in charge at the load 56 which is indicative of the difference in the periods of coincidence between the signal pulses 12 and the respective early and late gate pulses 54 and 52.

Capacitor 70 effects the transfer of the early gate pulses 54 to the upper end of secondary winding 14. Because the center-tap 80 is at A. C. ground potential, by virtue of the bypass capacitor 86, the transferred gating pulses will appear at the lower end of secondary winding 14 as signal pulses opposite in polarity to the spurious signal pulses 64; by proper adjustment of capacitor 70, the magnitude of the transferred pulses can be controlled so as to achieve virtual cancellation of the spurious signal pulses 64.

As is well known, the characteristics of any two tubes are rarely exactly the same initially; furthermore, tube characteristics change with aging. In the circuit above described, therefore, differences in the tube characteristics may result in intolerable differences in current flow through the tubes 20, 22, that is, circuit balance may be destroyed. As indicated previously, the resistors 15, 28 are provided for maintaining circuit balance at a safe level. This may be more clearly understood by considering the effects of the tube characteristics in the absence of resistors 15, 28, and then observing the effects of the resistors. Assume that the conductive resistances of the individual tubes are 880 ohms and 920 ohms; the ratio of these resistances is of course 22:23. If resistors 15, 28 are now placed in the tube circuits, each having a value of 4000 ohms, the individual circuit resistances are 4,880 ohms and 4,920 ohms, the ratio of which is 122:123. From these examples, it is clear that the resistors 15, 28 markedly reduce the effects of differences in the tube characteristics on circuit balance.

It should be readily apparent that the use of the circuit balancing resistors 15, 28, as above discussed, will facilitate mass production of the time discriminator of this invention. Tedious methods for selecting tubes having substantially equal characteristics may be dispensed with, it being necessary merely to check the tubes to ascertain that their characteristics fall within reasonably safe limits, and to use circuit balancing resistors 15, 28 which are readily available.

It is understood that where it is desired to rigidly control the circuit parameters for obtaining maximum possible gain with the tubes 20, 22, the balancing resistors 15, 28 can be eliminated when using tubes having substantially identical characteristics.

Preferably, the range in which the output signal level may be established is relatively small with respect to the signal voltage provided by the signal pulses 12', 12". By limiting this range to, say, two volts for signal voltages of 15 volts, the effects of slight fluctuations in the voltage sources provided by batteries 84 and 85 are substantially negligible.

The time discriminator will now be described in connection with the self-gating system of a radar receiver mentioned in the above example. Such a system is illustrated in Fig. 2.

Referring to Fig. 2, a receiver 90 of echo pulses is shown coupled to suitable utilization circuits 92 which are to be operated upon the arrival of the echo pulses. As previously mentioned, the times of occurrence of the echo pulses, with respect to the gating pulses, may vary, and gating of the receiver 90 must be maintained in synchronism with the echo pulses in order to effect optimum operation of the utilization circuits 92. To this end, a time discriminator 94 is coupled to the receiver 90, and signal pulses developed in the receiver in response to the echo pulses are applied to the time discriminator, in the manner of signal pulses 12', 12" of Fig. 1. A gate pulse-forming network 96 is coupled to the time discriminator 94 for developing the early and late gate pulses (Fig. 1) to be applied to the time discriminator. Gate pulse-forming network 96 may comprise a conventional oscillator and divider network for producing gating pulses.

The gate pulse-forming network 96 is also coupled to the receiver 90 for operating the receiver 90 in synchronism with the gating pulses. So long as there is time coincidence between the gating pulses and the echo pulses, operation of the receiver 90 in synchronism with the arrival of the echo pulses requires no added controls. However, when the times of occurrence of the respective echo and gating pulses differ, as when the incoming echo pulses shift with respect to the gating pulses, the utilization circuits 92 cannot be operated properly unless suitable controls are provided to reestablish coincidence between the gating pulses and the echo pulses. This is accomplished by means of the control circuit 98, which, for example, may be an integrating network coupled between the time discriminator 94 and the gate pulse-forming network 96. The time discriminator develops error signals which represent the difference in such times of occurrence, and the control circuit 98 operates in response to the error signals to change the operation of the gate pulse-forming network 96 until the gating pulses again coincide with the echo pulses.

Figs. 3–7 are idealized representations of waveforms of signals applied to and developed at different parts of the time discriminator of Fig. 1 and the self-gating system of Fig. 2. Referring now to Figs. 3–7, along with Figs. 1 and 2, successive signal or echo pulses (Fig. 3) applied to the time discriminator 94 from the receiver 90 may be separated (*a*) by equal time intervals, as indicated by equally-spaced pulses 100, 101, 102, (*b*) by successively increasing time intervals, as indicated by successively widely-spaced signal pulses 103, 104, 105, 106 following signal pulse 102, or (c) by successively decreasing time intervals, as indicated by successively more closely-spaced signal pulses 107 and 108 following signal pulse 106.

For the equally-spaced signal pulses 100—102, the early and late gating pulses (Figs. 4–5) applied to the control grids 32, 30 of the respective tubes 22, 20 (Fig. 1), are shown with their respective trailing and leading edges coinciding with the centers of the equally-spaced pulses 100, 101, 102. Each pair of the early and late gating pulses is shown for purposes of illustration as being the same width of the signal pulses. For such equal periods of coincidence of the signal pulses and the respective gating pulses, the tubes 20, 22 will conduct for equal intervals of time during the occurrence of each of the signal pulses 100, 101, 102.

Upon the grid bias of tube 22 being overcome by the early gate pulses, current flows from the load 56 through the tube 22, and may be designated as negative current pulses 110 (Fig. 6). With the occurrence of the trailing and leading edges of the respective early and late gate pulses, when tube 22 is biased off and tube 20 is rendered conductive, current pulses flow through tube 20 toward load 56; these may be designated as positive current pulses 111. As indicated in Fig. 6, for equal intervals of current flow through the respective tubes 22, 20 in the manner above described, negative current pulses 110 and the associated positive current pulses 111 are of equal duration. Accordingly, the net charge at the load 56 is zero, and the average potential level at the load (Fig. 7) remains unchanged.

Signal pulse 103 follows signal pulse 102 by a greater period of time than the equal periods between signal pulses 100, 101 and 101, 102, and thus may represent an increase in range between the receiver and the source of echo pulses. The trailing and leading edges of the associated early and late gate pulses occur in advance of the center of the signal pulse 103; accordingly, there is a decrease in the period of coincidence between the signal pulse 103 and the associated early gate pulse, while the period of coincidence between the signal pulse 103 and the associated late gate pulse remains the same as before. Accordingly, the tube 22, to which the early gate pulse is applied, conducts for a shorter period of time than the sequentially operated tube 20; this results in a negative current pulse 112 and a following positive current pulse 113 at the load 56 whose relative durations reflect the differences in times of coincidence of the respective gating pulses with the signal pulse 103. Since the positive current pulse 113 is the longer in duration, a net positive current pulse obtains which effects an increase in the charge or operating potential at the load 56 (Fig. 1), as indicated in Fig. 7. The resulting increase in average operating potential at the load 56 may then be utilized by the control circuit (Fig. 2) to change the operation of the gate pulse-forming network 96, which results in changing the positions of the gating pulses sufficiently to reestablish equal periods of coincidence between the echo pulses and the respective early and late gate pulses. Thus, for a following signal pulse 104 which is separated from signal pulse 103 by the same time interval as that which separated signal pulses 102, 103, the trailing and leading edges of the early and late gate pulses coincide with the center of the signal pulse 104. Equal negative and positive current pulses 110', 111' result in no further current change at the load 56.

Further conditions similar to that described above in connection with signal pulse 103 are illustrated by signal pulses 105 and 106, which occur at successively increasing time intervals. The trailing and leading edges of the associated early and late gate pulses associated with signal pulse 105 occur immediately following the leading edge of such signal pulse 105. Accordingly, a greater positive increase in the net charge at the load 56 is effected than obtained in the situation illustrated and described in connection with signal pulse 103. This increased charge actuates the control circuit 98 and gate pulse-forming network 96 in the manner above described for effecting coincidence of the signal pulses therewith.

The trailing and leading edges of the succeeding early and late gate pulses are shown as coinciding with the leading edge of the succeeding signal pulse 106. This means that signal pulse 106 is coincident only with the associated late gate pulse. Accordingly, tube 22 will not conduct, whereas tube 20 will conduct throughout the duration of the late gate pulse 106. A further increase in the operating potential at the load 56 results, and is utilized in the manner above described for again effecting coincident operation of the receiver 90 with the signal pulses arriving thereat.

Following signal pulse 106, succeeding signal pulses 107, 108 illustrate successively decreasing time intervals between incoming echo pulses arriving at the receiver 90. The positions of the trailing and leading edges of the early and late gate pulses associated with the respective signal pulses 107, 108 are shown as the reverse of the conditions shown and described in connection with signal pulses 103 and 105. Accordingly, successive decreases in net charge applied to the load 56 may be utilized to change the positions of the gating pulses sufficiently to effect operation of the receiver 90 in time coincidence with the echo pulses arriving thereat.

From the foregoing explanation, it is clear that there has been described a new and useful time discriminator, in which grid-controlled electron tubes are rendered operable only upon simultaneous application thereto of signal pulses and gating pulses, in which plate supply voltages for the tubes are provided by the signal pulses, and in which the circuit is insensitive to electrical characteristics which tend to effect improper operation thereof.

What is claimed is:

1. An electronic time discriminator circuit including first and second thermionic tubes, each having an anode, a cathode and at least one control grid; an impedance element providing a direct-current path between the anode of the first tube and the cathode of the second tube; means for impressing respective control signals upon said control grids; an input circuit, said input circuit being adapted to receive signal pulses; said input circuit being connected between the anode of said second tube and the cathode of said first tube and operable to apply received signal pulses to said tubes in proper polarity to establish anode-cathode supply voltages therefor; said tubes being conductive only upon the signal pulses being coincident with the control signals; and an output circuit coupled to said impedance element, said tubes being conductive during coincidence of said signal pulses and the respective control signals to develop an error signal at said impedance element which represents the difference in the conductive periods of said tubes.

2. An electronic time discriminator circuit including first and second electron tubes, each having a cathode, an anode and at least one control grid; a resistive impedance element connected between the anode of the first tube and the cathode of the second tube; a transformer input circuit connecting the anode of the second tube and the cathode of the first tube; means for applying signal pulses to said transformer input circuit for impressing said signal pulses across said tubes, said signal pulses during their occurrence constituting the anode-cathode supply voltages for said tubes; a gate pulse supply circuit, said gate pulse supply circuit being adapted to develop a pair of successive gate pulses and apply the respective gate pulses to the respective control grids of said tubes, said tubes being conductive only during coincidence between said signal pulses and the associated gate pulses; and an output circuit coupled to said impedance element for receiving an output signal that is representative of the time relationship between the signal pulses and the respective gate pulses.

3. A time discriminator for developing output signals representative of the relative time of occurrence of signal and gating pulses applied thereto and comprising, in combination, first and second grid-controlled electron tubes having their space-discharge paths connected in series through a common junction; the control grids of said tubes being normally biased to prevent conduction of said tubes; means coupled to the control grids of said tubes for applying respective gating pulses sequentially to the respective grids to overcome the bias on said tubes; a transformer coupled to said electron tubes, said transformer being adapted to apply a signal pulse across said space-discharge paths of proper polarity to establish space-current voltages for said tubes; said tubes being conductive during coincidence between the signal and gating pulses to develop at said junction an output signal that is a function of the difference in such periods of coincidence.

4. A time discriminator comprising, in combination, first and second electron tubes, each having an anode, a cathode and at least one control grid; a resistive impedance element connected between the cathode of said first tube and the anode of said second tube; first and second transformers respectively coupled to the grid-cathode circuits of the respective first and second tubes; said control grids normally being biased to cut-off; said first transformer being adapted to apply a first gating pulse to the control grid of said first tube, said second transformer being adapted to apply a second gating pulse to the control grid of said second tube upon the expiration of said first gating pulse; a third transformer having a secondary winding connecting the anode of said second tube and the cathode of said first tube; means for applying a signal pulse to said third transformer; said third transformer impressing said signal pulse across said tubes, said signal pulse constituting anode-cathode supply voltages for said tubes; said tubes being rendered conductive only during the periods of coincidence between the signal pulses and respective gating pulses, said first tube being operable to conduct current away from said impedance element during the period of coincidence between the signal pulse and said first gating pulse, said second tube conducting current toward said impedance element during coincidence between the signal pulse and said second gating pulse and an output circuit coupled to said impedance element.

5. The time discriminator defined in claim 4, including a variable direct-current source, and a center-tap connection from said secondary winding to said direct-current source for establishing a predetermined average operating potential for signals applied to said output circuit.

6. The time discriminator defined in claim 4, in which the anode of said second tube is capacitively coupled to said first transformer to effectively nullify control signals which may be transferred by interwinding capacitance of said first transformer to the cathode of said first tube, thereby to prevent spurious current flow through said first tube.

7. The time discriminator defined in claim 4, in which a further resistive element is connected in circuit with the anode of said first tube and the cathode of said second tube, said elements having substantially equal values of resistance across which voltage drops are at least equal to voltage drops across either of said tubes.

8. A time discriminator circuit comprising a source of input pulses, first and second electron discharge devices each having cathode, anode, and control elements, the cathode of said first device being connected to the anode of said second device, said source being connected to the anode of the first device and to the cathode of the second device, first and second sources of gate pulses respectively coupled to the control elements of said first and second devices, and an output circuit connected to the cathode of the first device and to the anode of the second device, said first device being conductive during coincidence of said input pulses and the gate pulses from said first source for producing in said output circuit signals of one polarity, and said second device being conductive during coincidence between said input pulses and the gate pulses from said second source to produce signals of opposite polarity in said output circuit.

9. The circuit of claim 8 wherein said first and second gate pulses are sequential, the time duration of a pair of such pulses being at least equal to the time duration of an individual input pulse.

References Cited in the file of this patent

UNITED STATES PATENTS

| | | |
|---|---|---|
| 2,537,569 | Ballard | Jan. 9, 1951 |
| 2,557,085 | Fish | June 19, 1951 |
| 2,599,675 | Volz | June 10, 1952 |
| 2,617,093 | Flyer | Nov. 4, 1952 |